(12) United States Patent
Riley

(10) Patent No.: US 8,413,364 B2
(45) Date of Patent: Apr. 9, 2013

(54) MULTI-GRAIN ZERO TURRET

(76) Inventor: Louis F. Riley, Weston, FL (US)

( * ) Notice: Subject to any disclaimer, the term of this patent is extended or adjusted under 35 U.S.C. 154(b) by 1165 days.

(21) Appl. No.: 12/025,013

(22) Filed: Feb. 2, 2008

(65) Prior Publication Data

US 2012/0147488 A1  Jun. 14, 2012

(51) Int. Cl.
*F41G 1/38* (2006.01)

(52) U.S. Cl.
USPC .......................................................... 42/122

(58) Field of Classification Search ...................... 42/122
See application file for complete search history.

(56) References Cited

U.S. PATENT DOCUMENTS

2011/0271577 A1* 11/2011 Davidson ........................ 42/122

* cited by examiner

*Primary Examiner* — James Jones
(74) *Attorney, Agent, or Firm* — Hartman Global IP Law; Gary M. Hartman; Domenica N. S. Hartman

(57) ABSTRACT

A novel, adjustable locking windage and elevation turret assembly capable of being re-zeroed, for the improved functionality and accuracy of a scope.

21 Claims, 4 Drawing Sheets

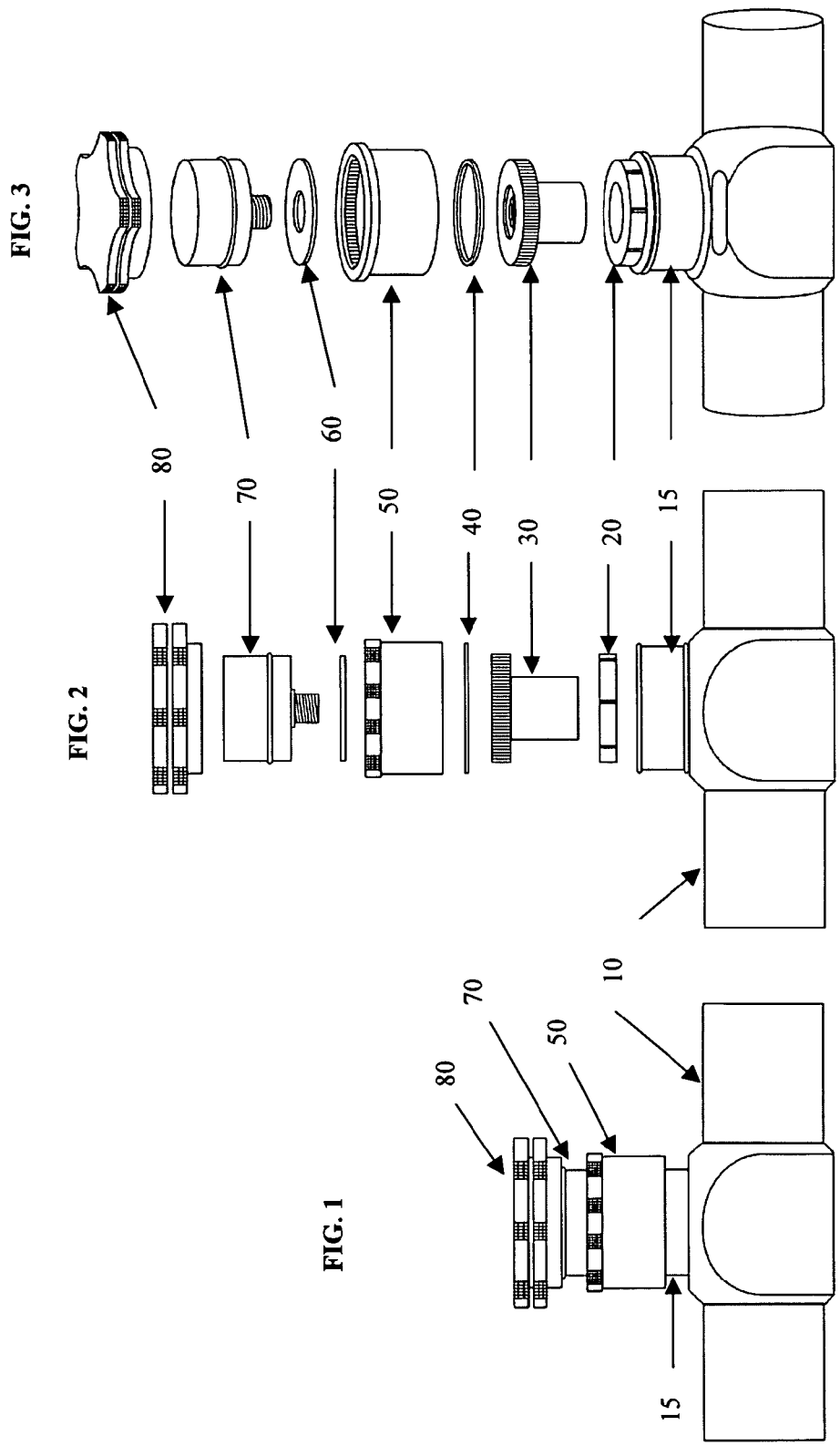

MULTI-GRAIN ZERO TURRET

FIELD OF THE INVENTION

This invention relates to the design and construction of a novel, adjustable locking windage and elevation turret assembly capable of being re-zeroed, for the improved functionality and accuracy of a scope.

BACKGROUND OF THE INVENTION

Scopes, particularly those used for hunting, are well known in the prior art. Scopes are generally used to assist hunters in aiming at desired targets. However, because gravity and wind play a role in the trajectory of a bullet by causing the bullet to drop and/or drift to one side of the intended target, hunters have to make adjustments to the scope to account for these effects. Moreover, as the effect of gravity and wind drift on a bullet's trajectory will vary depending upon the distance to the target, multiple adjustments may be necessary at a shooting range or in the field to account for these variances. A hunter or shooter may desire to zero the scope after adjustment so that a return to zero may be easily accomplished subsequent to in-field scope adjustments for varied hunting and shooting conditions as described above. Alternatively, a hunter or shooter may need to utilize multiple compositional markings on a scope turret to accommodate various shooting conditions and equipment such as bullets of various calibers, profiles or weights.

To address the above and other related scope adjustment and performance issues, the prior art has developed to include various adjustment knob assemblies. Most commonly, the scope adjustments are implemented in one of two ways. One such way is accomplished by utilizing an adjustment knob assembly that is manually rotated to make the desired adjustments using a screwdriver or similar device. The adjustment knob is covered by a weather resistant dust cap that is usually screwed over the adjustment knob assembly. Problems with these types of assemblies include the time and inconvenience of having to remove the dust cap and the necessity of utilizing a small screwdriver or similar device to effectuate adjustments. During the time it takes to implement these steps, a hunting target may have moved or, in the case of timed shooting competitions, valuable shooting time has elapsed. These assemblies also do not allow for re-zeroing of the turret compositional markings.

The second most common way utilizes an adjustment knob assembly that may rotate freely thereby allowing the user to make adjustments quickly. This type of adjustment assembly is generally reserved for scopes used on competition firearms where the firearm is not used in the hunting field but is maintained in a hard case and removed to a shooting bench or platform for competition fire. However, the drawback to this adjustment assembly is that the assembly may be easily knocked out of position and is not designed for field use where a sturdy and weather resistant adjustment assembly is a necessity. Again, these assemblies also do not allow for re-zeroing of the turret compositional markings.

Re-zeroing of turret compositional markings is important because scope adjustments often place the composition markings at varied locations, requiring the shooter to remember the current location to effectuate a rezeroing of the scope, or to engage in mathematical calculations to re-adjust or re-zero the scope after the turret mechanism has adjusted the internal reticle assembly.

The use of a push pull knob assembly is disclosed in prior art U.S. Pat. No. 6,721,095 B2 Combined Illuminated Reticle and Focus Knob disclosing the use of a push pull turn knob to activate an LED located in the sidewall of a reticle by engaging and disengaging a battery in the turn knob. The turn knob is further used to focus the scope by rotation of the turn knob. While this invention allows hunters to make quick adjustments using a single knob, it does not contemplate a locking device that would keep the knob in either the pushed or pulled position, or from rotating and in fact, does not address the problem solved by the instant invention. It also does not allow the shooter to easily re-adjust and re-zero the turret drum composition markings as desired nor utilize an invertible turret drum. The cited art knob may be knocked out of position easily; thus causing the illuminated reticle to turn off or the scope to become unfocused at an inopportune time, such as when attempting to shoot a target. This type of push-pull assembly, like others, is also limited in its design to two positions, unlike the current invention, which is capable of utilizing three turret positions for maximum utility.

Clearly there is a need for an adjustable locking turret assembly that allows for quick and easy adjustment of a scope, prevents the turret assembly from moving once the desired position is set, and allows for rezeroing the composition markings of the turret assembly.

SUMMARY OF THE INVENTION

The inventive structure presents a number of advantages over the prior art. First, the invention is simple to form. The turret assembly may be attached to a scope or other sighting mechanism and may be adapted to accommodate a variety of turret drums and compositional markings for multiple uses, increasing the functional potential of the scope. In a preferred embodiment, rubber washers, o-rings and/or any other weather resistant material and/or sealant are strategically placed, creating a weather resistant seal to prevent environmental elements from causing damage to the interior of the scope.

In a preferred embodiment, a turret drum is placed over a cylinder and mates alternatively with a first connector or a second connector at the base of the turret. Mating with the first connector fixedly secures the turret drum in relation to the scope turret. Mating with the second connector allows reticle adjustment by rotation of the turret drum. Raising the turret drum towards the turret cap disengages the turret drum from both connectors and allows the turret drum to be rotated such that composition markings may be aligned in relation to the scope as desired, without affecting reticle movement or adjustment. The turret drum may then be secured by returning it to its lower mating position with the first connector.

BRIEF DESCRIPTION OF THE DRAWINGS

FIG. 1 is a side view of the turret assembly sitting atop a scope tube according to the embodiments described herein.

FIG. 2 is an exploded side view of the turret assembly according to the embodiments described herein.

FIG. 3 is an alternative exploded side view of the turret assembly according to the embodiments described herein.

DETAILED DESCRIPTION OF THE INVENTION

Figure 4:
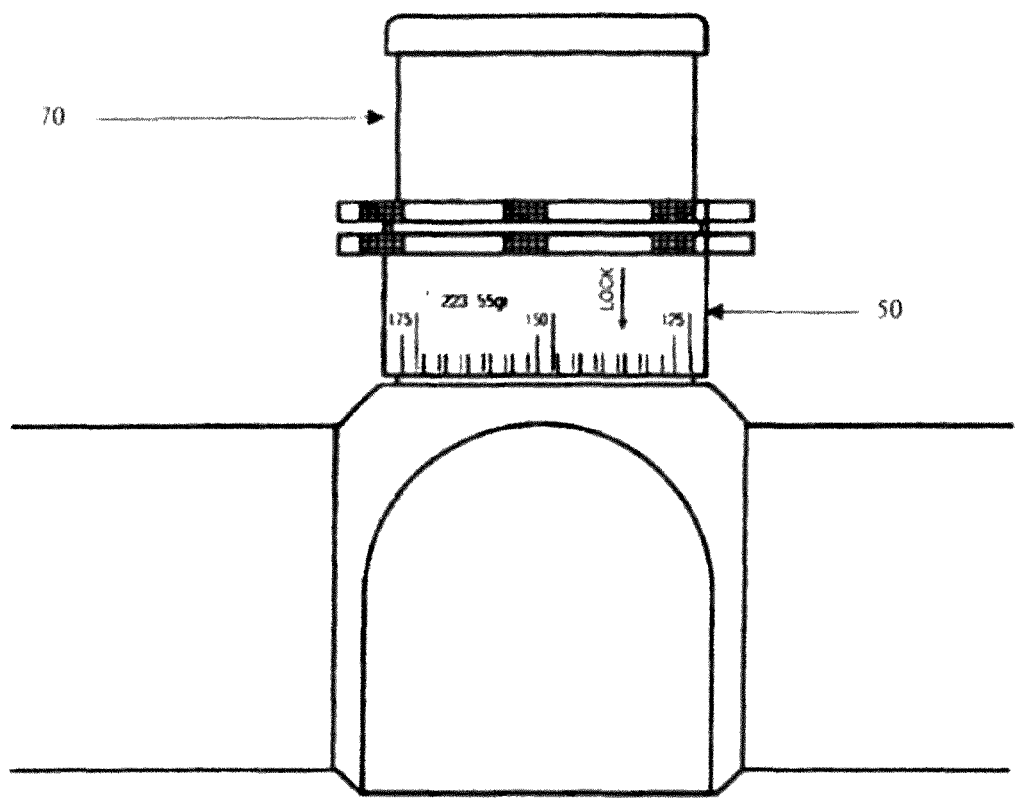
FIG. 4 is a side view of the turret assembly with the turret drum in the down locked position according to the embodiments described herein.

Shown in FIG. 1 is the turret assembly attached to the turret (15) of a scope (10). The turret drum (50) is shown in position, encircling the cylinder (70) and turret (15), with turret cap (80) secured to cylinder (70). When turret drum (50) is in the upper-most position for re-zeroing, turret cap (80) retains the turret drum (50) in position over cylinder (70).

Shown in FIGS. 2 and 3 are exploded views of the turret assembly. Starting at the bottom of the figures, a turret (15) sits atop a scope tube (10) A first connector (20) is fixedly attached to the turret (15) and a second connector (30) is rotatably positioned atop first connector (20). An optional washer-spacer (40), preferably made of brass, is positioned atop second connector (30) to reduce friction, securely set or allow for tolerances between adjacent parts. An optional second washer-spacer (60) is positioned atop first washer-spacer. Cylinder (70) is fixedly attached to second connector. Turret drum (50) is positioned over cylinder (70) so as to be rotatable about cylinder (70). Turret cap (80) is secured atop cylinder (70). Turret cap (80) may alternatively and optionally retain turret drum (50) over cylinder (70) and/or allow for easy removal of cylinder and turret drum for replacement with alternative turret drums having different compositional markings.

Figure 5:
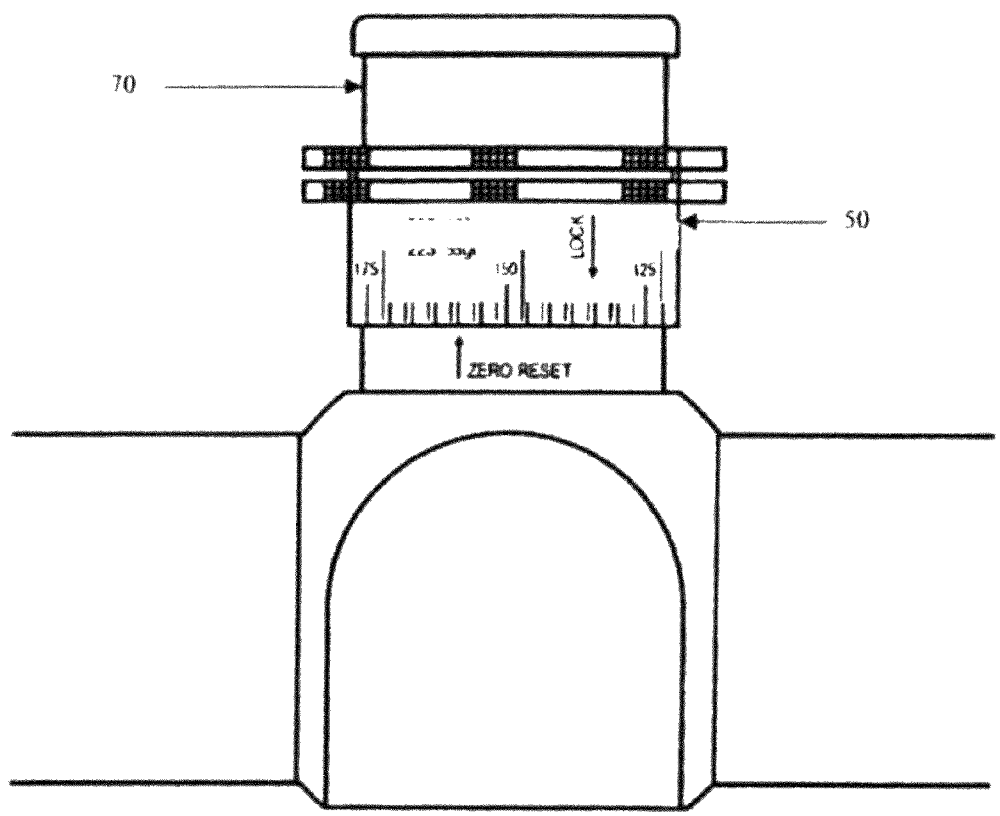
FIG. 5 is a side view of the turret assembly with the turret drum in the middle adjustment position according to the embodiments described herein.
Figure 6:
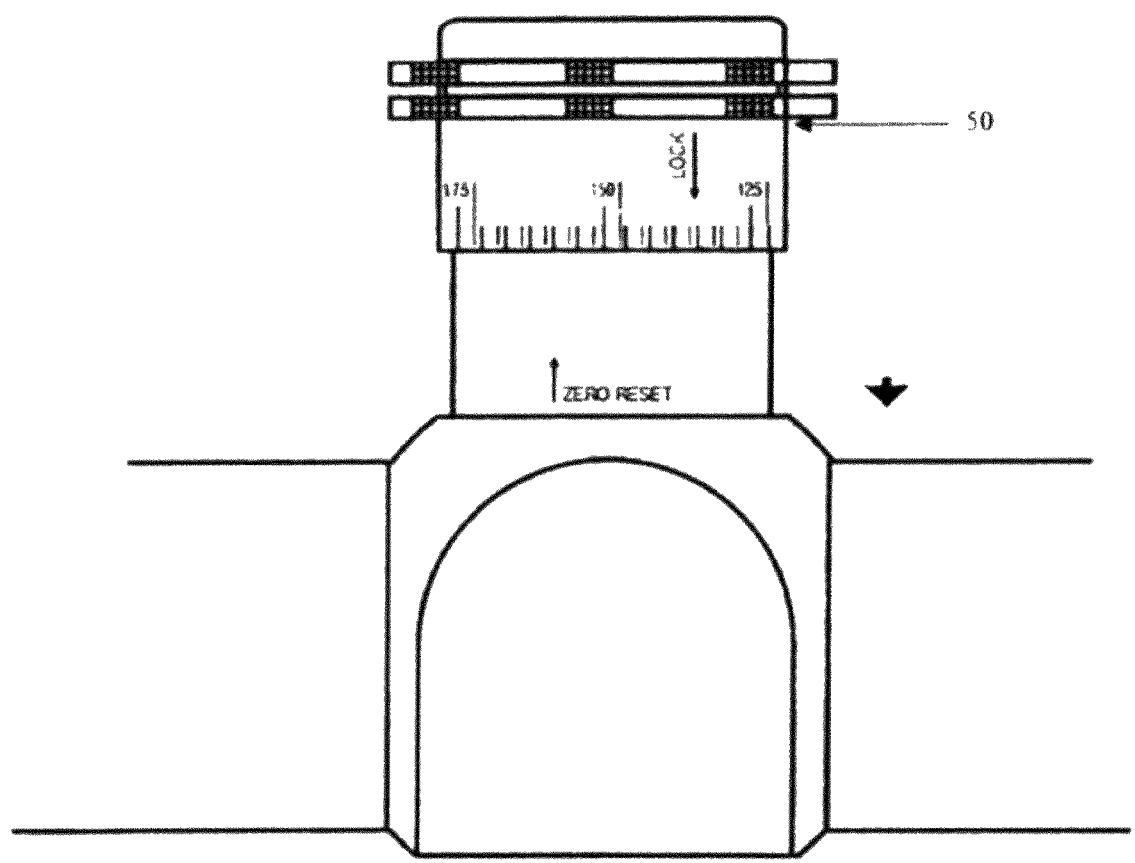
FIG. 6 is a side view of the turret assembly with the turret drum in the up rezeroing position according to the embodiments described herein.

Shown in FIGS. 4 through 6 are the three separate turret drum positions. Compositional markings are imprinted upon the outside surface of turret drum (50). These markings may constitute a single set of markings or multiple sets of markings around the circumference of the drum, to account for different elevation and windage figures based on environmental conditions, bullet caliber, bullet weight or other factors affecting the trajectory of a bullet.

FIG. 4 depicts the turret drum in the lower, locked position wherein the turret drum may neither adjust the scope reticle assembly nor rotate to allow for rezeroing or compositional adjustment. Turret drum (50) is fixedly held in position by frictional fit over one or more ridges depicted on the outer surface edge of first connector (20) as reflected in FIGS. 2 and 3.

FIG. 5 depicts the turret drum in the middle position wherein the reticle assembly may be adjusted by rotating the turret drum (50) about turret (15) and cylinder (70). In this position, turret drum (50) is disengaged from first connector and vertical grooves along the top inner surface area of turret drum (50), as depicted in FIG. 3, mate with vertical grooves along the outside edge of connector (30), as depicted in FIG. 3. Rotation of turret drum (50), consequently results in rotation of connector (20), which is connected to the scope reticle system by conventional means well known in the prior art.

FIG. 6 depicts the turret drum in the upper position wherein the turret drum may be freely rotated about the turret and cylinder to allow for rezeroing or any other adjustment of the compositional markings of the turret drum in relation to the scope. In this position, the turret drum is disengaged from the first connector and second connector.

Embodiments of the turret assembly may vary from the above description and drawing. For instance, either one or both of first washer-spacer (40) and second washer-spacer (60) may be omitted. Cylinder (70) and Turret cap (80) may alternatively be formed integral. Turret (15) and first connector (20) may also alternatively be formed integral. In another embodiment the second connector and cylinder may be formed integral. Turret drum may be retained in position around cylinder by means other than a turret cap including spring-biased pins, o-rings, lock washers and their equivalent. Second connector (30) may be rotatably affixed atop first connector (20) by means other than the cylindrical extension of second connector positioned within first connector (20) as depicted in FIGS. 2 and 3. Other changes, variations and embodiments will be apparent from the above description, the drawings and the claims.

What is claimed is:

1. A turret drum assembly comprising:
   a scope turret comprising a reticle system;
   a first connector fixedly attached to the scope turret;
   a second connector rotatably positioned atop the first connector and connected to the reticle system of the scope turret;
   a cylinder fixedly attached to the second connector; and
   a turret drum positioned over the cylinder so as to be rotatable about the cylinder and movable in an axial direction thereof and relative to the scope turret between a locked position, a re-zeroing position, and an adjustment position therebetween, wherein, when the turret drum is in the locked position it is fixedly rotationally held in a rotational position by the first connector relative to the scope turret, and wherein when the turret drum is in the adjustment position it is not fixedly rotationally held in the rotational position by the first connector and is engaged with the second connector so as to rotate the second connector to adjust the reticle assembly connected thereto, and wherein when the turret drum is in the re-zeroinq position it is disengaged from the first and second connectors and is freely rotatable about the cylinder.

2. A turret drum assembly as described in claim 1, further comprising a turret cap secured atop the cylinder.

3. A turret drum assembly as described in claim 1, further comprising a spacer-washer positioned between the second connector and the cylinder.

4. A turret drum assembly as described in claim 2, further comprising a spacer-washer positioned between the second connector and the cylinder.

5. A turret drum assembly as described in claim 1, further comprising multiple compositional markings on an outside surface of the turret drum.

6. A turret drum assembly as described in claim 1, further comprising multiple compositional markings on an outside surface of the turret drum and wherein the turret drum is an invertible turret drum.

7. A turret drum assembly as described in claim 2, further comprising multiple compositional markings on an outside surface of the turret drum.

8. A turret drum assembly as described in claim 2, further comprising multiple compositional markings on an outside surface of the turret drum and wherein the turret drum is an invertible turret drum.

9. A turret drum assembly comprising:
   a turret drum movable in an axial direction thereof between a locked position, a re-zeroing position, and an adjustment position therebetween;
   a scope turret comprising a reticle system and including one or more ridges that frictionally rotationally secure the turret drum in a rotational position when the turret drum is in the locked position thereof and do not frictionally rotationally secure the turret drum in the rotational position when the turret drum is in the adjustment position thereof;
   a connector having a groove on an outside surface thereof adapted to selectively mate with a corresponding recess on an inside surface of the turret drum when the turret drum is in the adjustment position thereof, the connector being rotatably positioned atop the scope turret and connected to the reticle system of the scope turret so that rotation of the turret drum when in the adjustment position thereof causes rotation of the reticle system;

a cylinder fixedly attached to the connector; and wherein the turret drum is positioned over the cylinder so that when the turret drum is in the re-zeroinq position thereof it is disengaged from the turret and the connector and is freely rotatable about the cylinder.

10. A turret drum assembly as described in claim 9 further comprising a turret cap secured atop the cylinder.

11. A turret drum assembly as described in claim 9 further comprising a spacer-washer positioned between the connector and the cylinder.

12. A turret drum assembly as described in claim 9 further comprising multiple compositional markings on an outside surface of the turret drum.

13. A turret drum assembly as described in claim 9 further comprising multiple compositional markings on an outside surfacesurface of the turret drum and wherein the turret drum is an invertible turret drum.

14. A turret drum assembly as described in claim 10 further comprising a spacer-washer positioned between the connector and the cylinder.

15. A turret drum assembly as described in claim 10 further comprising multiple compositional markings on an outside surface of the turret drum.

16. A turret drum assembly as described in claim 10 further comprising multiple compositional markings on an outside surface surface of the turret drum and wherein the turret drum is an invertible turret drum.

17. A turret drum assembly comprising:

a scope turret comprising a reticle system;

a turret drum movable in an axial direction thereof between a locked position, a re-zeroing position, and an adjustment position therebetween relative to the scope turret;

a first connector fixedly attached to the scope turret and rotationally securing the turret drum in a rotational position when the turret drum is in the locked position thereof and do not frictionally rotationally secure the turret drum in the rotational position when the turret drum is in the adjustment position thereof;

a second connector rotatably positioned atop the first connector and connected to the reticle system of the scope turret, the second connector including a groove or recess on an outside surface thereof adapted to selectively mate with a corresponding groove or recess on an inside surface of the turret drum when the turret drum is in the adjustment position thereof so that rotation of the turret drum when in the adjustment position thereof causes rotation of the reticle system; and wherein the turret drum is positioned over the second connector so that when the turret drum is in the re-zeroinq position thereof it is disengaged from the second connector and is freely rotatable about the second connector.

18. A turret drum assembly as described in claim 17 further comprising a turret cap secured atop the second connector.

19. A turret drum assembly as described in claim 17 further comprising a spacer-washer positioned between the first and second connectors.

20. A turret drum assembly as described in claim 17 further comprising multiple compositional markings on an outside surface surface of the turret drum.

21. A turret drum assembly as described in claim 17 further comprising multiple compositional markings on an outside surface of the turret drum and wherein the turret drum is an invertible turret drum.

\* \* \* \* \*